(12) United States Patent
Chakra et al.

(10) Patent No.: US 10,728,151 B2
(45) Date of Patent: *Jul. 28, 2020

(54) CHANNELING ELEMENTS IN AN ANALYTICS ENGINE ENVIRONMENT

(71) Applicant: International Business Machines Corporation, Armonk, NY (US)

(72) Inventors: Al Chakra, Apex, NC (US); Alexandre A. Da Silva, Morrisville, NC (US); Jeremy A. Greenberger, Raleigh, NC (US); Li Li, Cary, NC (US); Allison M. Moore, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/624,809

(22) Filed: Jun. 16, 2017

(65) Prior Publication Data

US 2018/0365052 A1    Dec. 20, 2018

(51) Int. Cl.
*H04L 12/801* (2013.01)
*G06F 9/48* (2006.01)
(Continued)

(52) U.S. Cl.
CPC ............ *H04L 47/10* (2013.01); *G06F 9/4881* (2013.01); *G06F 16/2457* (2019.01);
(Continued)

(58) Field of Classification Search
CPC ................. G06F 16/2457; G06F 16/24568
See application file for complete search history.

(56) References Cited

U.S. PATENT DOCUMENTS 6,028,970 A * 2/2000 DiPiazza ................. G06K 9/03
382/229
7,499,408 B1 * 3/2009 Black ................. H04L 12/2856
370/252
(Continued)

FOREIGN PATENT DOCUMENTS

WO      2014194000 A1    12/2014

OTHER PUBLICATIONS

Bailis et al, "Prioritizing Attention in Fast Data: Principles and Promise", Stanford InfoLab, CIDR Jan. 2017 (Year: 2017).*
(Continued)

*Primary Examiner* — Ramy M Osman
(74) *Attorney, Agent, or Firm* — Cantor Colburn LLP; Teddi Maranzano

(57) ABSTRACT

Embodiments include techniques for channeling elements in an analytics engine environment, techniques include analyzing a current process, and identifying critical data element types associated with the current process. The techniques also include receiving a real-time data stream including a plurality of data elements, and pre-filtering the plurality of data elements, wherein the pre-filtering determines one or more of the plurality of data elements are associated with the critical data element type. The technique includes selecting a channel of a plurality of channels to fast-path the one or more of the plurality of data elements based at least in part on the pre-filtering, and increasing a confidence level corresponding to the current process and the critical data element type based on a state of the current process.

9 Claims, 5 Drawing Sheets

(51) Int. Cl.

| | | |
|---|---|---|
| *G06F 16/2455* | (2019.01) | |
| *G06F 16/2457* | (2019.01) | |
| *G06N 20/00* | (2019.01) | |
| *H04L 12/26* | (2006.01) | |
| *H04L 29/08* | (2006.01) | |
| *H04L 12/721* | (2013.01) | |
| *H04L 12/851* | (2013.01) | |

(52) U.S. Cl.
CPC .. *G06F 16/24568* (2019.01); *G06F 16/24578* (2019.01); *G06N 20/00* (2019.01); *H04L 43/04* (2013.01); *H04L 43/08* (2013.01); *H04L 43/10* (2013.01); *H04L 45/12* (2013.01); *H04L 47/24* (2013.01); *H04L 67/12* (2013.01)

(56) References Cited

U.S. PATENT DOCUMENTS

| | | | | |
|---|---|---|---|---|
| 9,432,336 | B2* | 8/2016 | Ostrowski | H04L 63/029 |
| 2003/0103465 | A1* | 6/2003 | Counterman | H04L 47/10 370/252 |
| 2006/0080267 | A1 | 4/2006 | Nelken | |
| 2006/0224528 | A1 | 10/2006 | Liu et al. | |
| 2008/0043716 | A1* | 2/2008 | Toombs | H04L 45/121 370/351 |
| 2008/0170510 | A1* | 7/2008 | Singh | H04L 45/12 370/254 |
| 2009/0214112 | A1* | 8/2009 | Borrey | H04N 1/40 382/167 |
| 2013/0046863 | A1* | 2/2013 | Bastian | H04L 47/24 709/220 |
| 2013/0124465 | A1* | 5/2013 | Pingel | H04L 67/12 707/610 |
| 2013/0249695 | A1* | 9/2013 | Hann | G06Q 10/06311 340/573.7 |
| 2015/0066593 | A1* | 3/2015 | Huang | G06Q 30/0202 705/7.31 |
| 2015/0088807 | A1* | 3/2015 | Toppin | G06F 16/254 707/602 |
| 2015/0127646 | A1* | 5/2015 | Shaw | G06F 16/254 707/737 |
| 2015/0180963 | A1* | 6/2015 | Luecke | H04L 45/124 709/203 |
| 2015/0186452 | A1* | 7/2015 | Meng | H04L 67/1097 700/736 |
| 2015/0310021 | A1* | 10/2015 | Alexander | G06F 16/2336 707/748 |
| 2016/0085641 | A1* | 3/2016 | Nagasubramaniam | H04L 41/0654 714/4.11 |
| 2016/0140442 | A1* | 5/2016 | Lee | G06N 20/00 705/2 |
| 2016/0150024 | A1* | 5/2016 | White | H04L 45/70 709/203 |
| 2016/0246838 | A1 | 8/2016 | Li et al. | |
| 2016/0321594 | A1* | 11/2016 | Linde | G06Q 10/06395 |
| 2017/0061285 | A1* | 3/2017 | Hikone | G06N 20/00 |
| 2017/0105222 | A1* | 4/2017 | Nieman | H04W 8/005 |
| 2017/0154058 | A1* | 6/2017 | May | G06F 16/2457 |
| 2017/0329837 | A1* | 11/2017 | Barrett | G06F 16/283 |
| 2018/0285767 | A1* | 10/2018 | Chew | H04L 67/1097 |
| 2018/0365052 | A1* | 12/2018 | Chakra | G06F 16/24568 |
| 2018/0365054 | A1* | 12/2018 | Chakra | G06F 16/24568 |

OTHER PUBLICATIONS

Al Chakra, et al., Pending U.S. Appl. No. 15/807,994 entitled "Channeling Elements in an Analytics Engine Environment," filed Nov. 9, 2017.

List of IBM Patents or Patent Applictions Treated as Related; (Appendix P), Filed Nov. 9, 2017, 2 pages.

* cited by examiner

CHANNELING ELEMENTS IN AN ANALYTICS ENGINE ENVIRONMENT

BACKGROUND

The present invention generally relates to routing and forwarding data, and more specifically, to channeling elements in an analytics engine environment.

Data analytics are a critical component to monitor and analyze the performance of a system. Data analytics can be used to troubleshoot different processes by analyzing large amounts of information to determine any patterns and correlations among the data. During a troubleshooting operation, it is important to collect as much information as possible that may be associated with the issue or point of focus. The further away from the event the information is collected, the relevance of the information can become diminished. The reports produced from the analytics engines can be used by system developers and administrators to modify the configuration of the software and hardware to improve the performance of their systems and networks.

SUMMARY

Embodiments of the present invention are directed to a computer-implemented method for channeling data elements in an analytics engine environment. A non-limiting example of the computer-implemented method includes analyzing a current process, and identifying critical data element types associated with the current process. The method also includes receiving a real-time data stream including a plurality of data elements, and pre-filtering the plurality of data elements, wherein the pre-filtering determines one or more of the plurality of data elements are associated with the critical data element type. The method includes selecting a channel of a plurality of channels to fast-path the one or more of the plurality of data elements based at least in part on the pre-filtering, and increasing a confidence level corresponding to the current process and the critical data element type based on a state of the current process.

Embodiments of the present invention are directed to a system for channeling data elements in an analytics engine environment. A non-limiting example of the system includes a receiver, a plurality of channels, an analytics engine, and a storage medium, the storage medium being coupled to a processor. The processor is configured to analyze a current process, and identify critical data element types associated with the current process. The processor is configured to further receive a real-time data stream including a plurality of data elements, and pre-filter the plurality of data elements, wherein the pre-filtering determines one or more of the plurality of data elements are associated with the critical data element type. The processor is configured to select a channel of a plurality of channels to fast-path the one or more of the plurality of data elements based at least in part on the pre-filtering, and increase a confidence level corresponding to the current process and the critical data element type based on a state of the current process.

Embodiments of the invention are directed to a computer program product for channeling data elements in an analytics engine environment, the computer program product comprising a computer readable storage medium having program instructions embodied therewith. The program instructions are executable by a processor to cause the processor to perform a method. A non-limiting example of the method includes analyzing a current process, and identifying critical data element types associated with the current process. The method also includes receiving a real-time data stream including a plurality of data elements, and pre-filtering the plurality of data elements, wherein the pre-filtering determines one or more of the plurality of data elements are associated with the critical data element type. The method includes selecting a channel of a plurality of channels to fast-path the one or more of the plurality of data elements based at least in part on the pre-filtering, and increasing a confidence level corresponding to the current process and the critical data element type based on a state of the current process.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
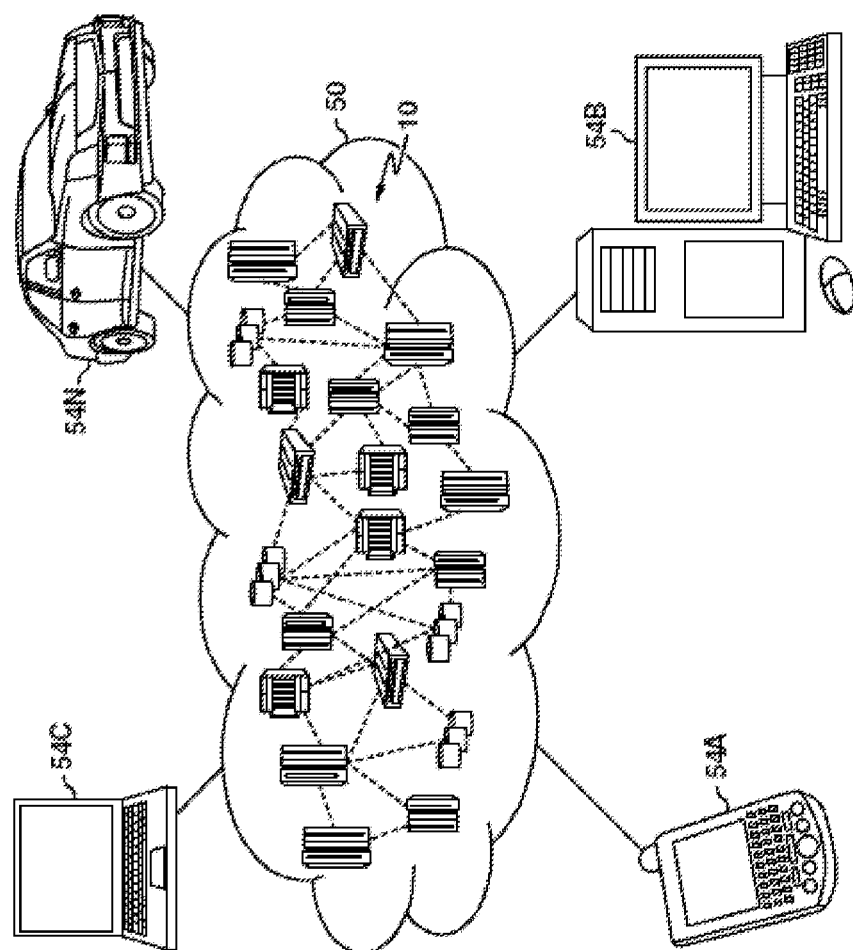
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
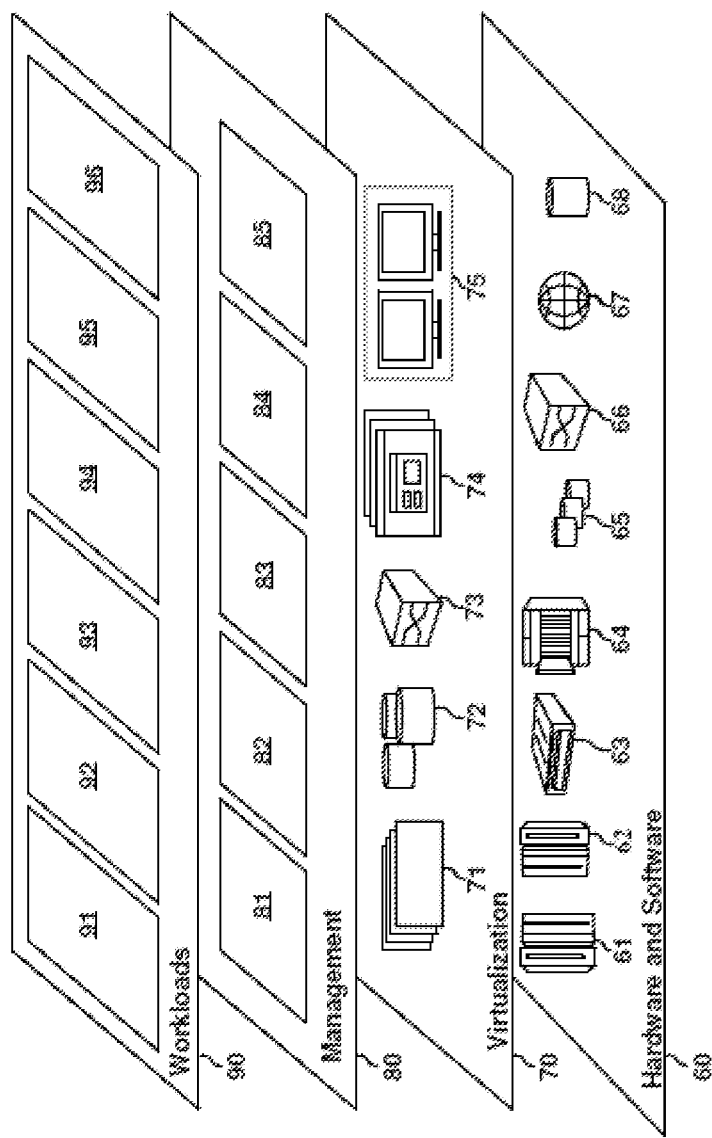
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Figure 3:
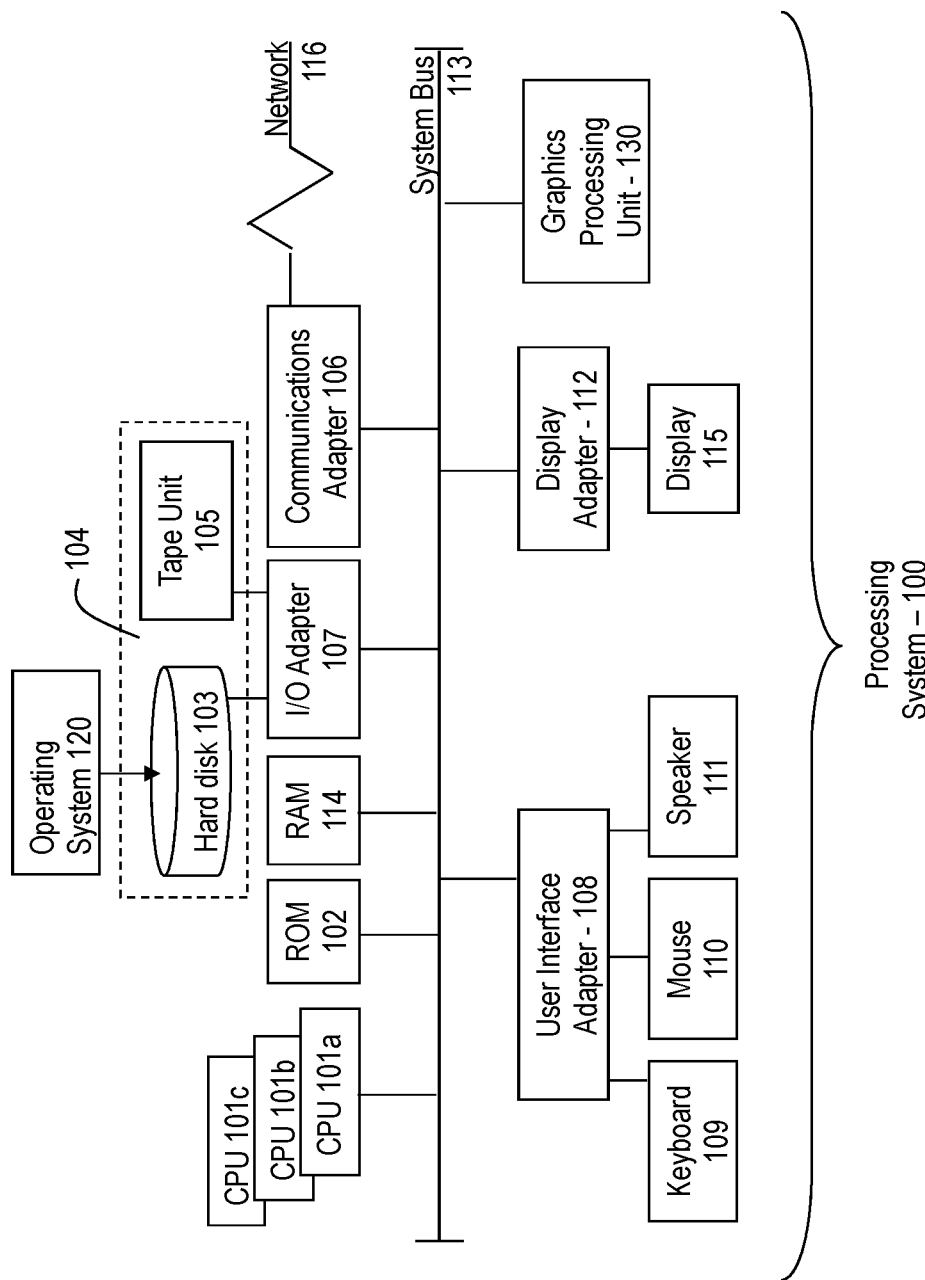
FIG. 3 illustrates a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101).

In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

As analytics engines process large amounts of data, it becomes important to ensure that when a particular process is being analyzed, the most relevant information related to the process is received in a timely manner. If the data is not received in time, the data that was once valuable is now obsolete and cannot be used to solve the problem. The analytics engine may not receive the data in time because of an overload in received data, network delays, and lag time in processing. If obsolete data is sent over a priority path, this can prevent other data elements that are actually critically to solving the issue from being received in time. The analytics engine can experience a delay in processing the critical elements that are needed because the non-critical information has not been filtered based on the urgency of the targeted process.

Turning now to an overview of the aspects of the invention, one or more embodiments of the invention address the above-described shortcomings of the prior art by providing a technique to identify critical elements of a real-time data stream that are needed for solving a current problem being analyzed by the analytics engine. The analytics engine will relay the critical data element types that are required for solving and/or analyzing the existing issue to a receiver of the data stream. The receiver that receives the information will identify the critical elements of the data stream and determine a channel to fast path the critical data to the analytics engine for processing.

The described technique considers several factors when determining the data elements and the channel to fast path through the system from the received to an analytics engine. First, a process for analysis and the associated critical elements are identified to resolve the issues are determined. The identified problem will be correlated to the incoming data stream to determine which data of the received real-time stream are critical elements. Subsequently, the analytics engine will notify the receiver to pre-filter any received data including the critical elements.

Next, the critical data elements will be pre-filtered from the incoming data stream. After the pre-filtering is performed, one of the available channels in the system will be selected to fast path the data to ensure the data is received at the analytics engine in an efficient manner. The speed of each channel will be determined and the congestion that is associated with each channel will also be determined when making the selection. As the data is received at the analytics engine, the analytics can determine whether the critical elements of the data is assisting in troubleshooting the issue and if so, the confidence level for correlating the issue and the critical elements can be increased. A database correlating the issue, critical elements, and confidence level can be stored to subsequently address the issue or similar issue in such an event.

The above-described aspects of the invention address the shortcomings of the prior art by fast pathing elements that have been determined to be critical to solving a current issue.

Figure 4:
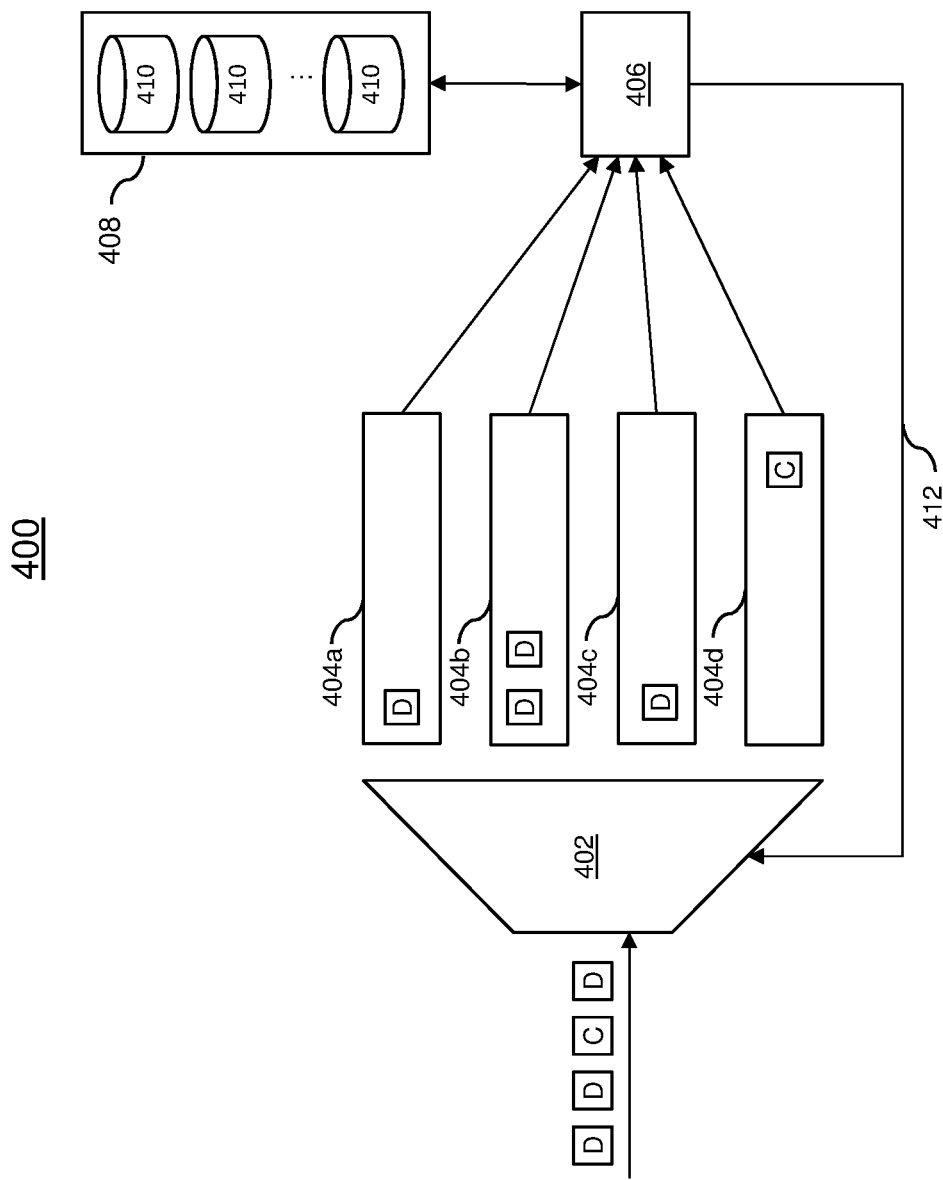
FIG. 4 depicts a system for channeling data elements in an analytics engine environment in accordance with one or more embodiments.

Referring now to FIG. 4, a system 400 for channeling data elements in an analytics engine environment is provided. The system 400 includes a receiver 402. The receiver 402 is configured to receive real-time data streams from one or more different sources. In addition, the received data can arrive in different formats, protocols, and at different rates. The receiver 402 is configured to pre-filter the individual data elements of the real-time data stream and select a channel 404 to fast path the individual data elements to the analytics engine 406. The channel 404 selection can be based on several factors including the received data type and relevance to the problem being analyzed by the analytics engine, the channel configuration and availability of each channel, the feedback from the analytics engine, etc.

The channels 404 can comprise different bandwidths and performance. For example, the channel 404a can be configured as a low speed channel, 404b and 404c can be configured as medium speed channels, and channel 404d can be configured as a high speed channel. In an embodiment, a channel is a HiperSocket for a system Z and is configured with the fastest speeds. A HiperSocket is an IBM technology for high-speed communications between partitions on a server with a hypervisor.

In the non-limiting example provided in FIG. 4, the critical data element C is forwarded over the high speed channel 404d, while the other data elements D are transmitted over the other channels.

In one or more embodiments, the system 400 can be configured with a different number of channels having different performance characteristics. In the system 400, the plurality of channels 404 are coupled to the analytics engine 406 which processes the data. The analytics engine 406 can analyze big data from storage 408 including a plurality of databases 410. The analytics engine 406 is configured to determine any patterns or correlations of data that associated with a particular process or issue.

The analytics engine 406 can store records in the storage 408 of the learned patterns relating the data element types to the specific issues or target processes being analyzed. In addition, the analytics engine 406 can set and update a confidence level based on the success or resolving issues based on the information provided in the records. In one or more embodiments, the system can be coupled to a cloud network for the exchange of data and communication.

The analytics engine 406 is also configured to provide feedback 412 to a receiver 402 to update the critical element type that is associated with the current process being analyzed. The receiver 402 uses the feedback 412 to dynamically update and fast path the received critical data elements from the real-time data stream to the analytics engine 406. In one or more embodiments, more than one analytics engine 406 can exist within the system.

In a non-limiting example, in a healthcare setting a patient may describe a condition to a doctor indicating signs of blurry vision, constant hunger and thirst, persistent fatigue, and tingling feet. Data including the patient's symptoms, medical history, and personal information is collected. This information can be entered into an analytics engine along with data from other sources. As data is entered, over time the system learns to recognize certain data elements that provide additional value if input data shows signs of diabetes during analysis. In this particular example, certain data elements, such as blood sugar level, numb hands, or excessive thirst are recognized by the system as providing more immediate value than other data elements such as weight, family history, or fatigue level. These data elements can be fast pathed so they can be ingested into the system quicker and lead to an increased confidence level of diagnosis.

Figure 5:
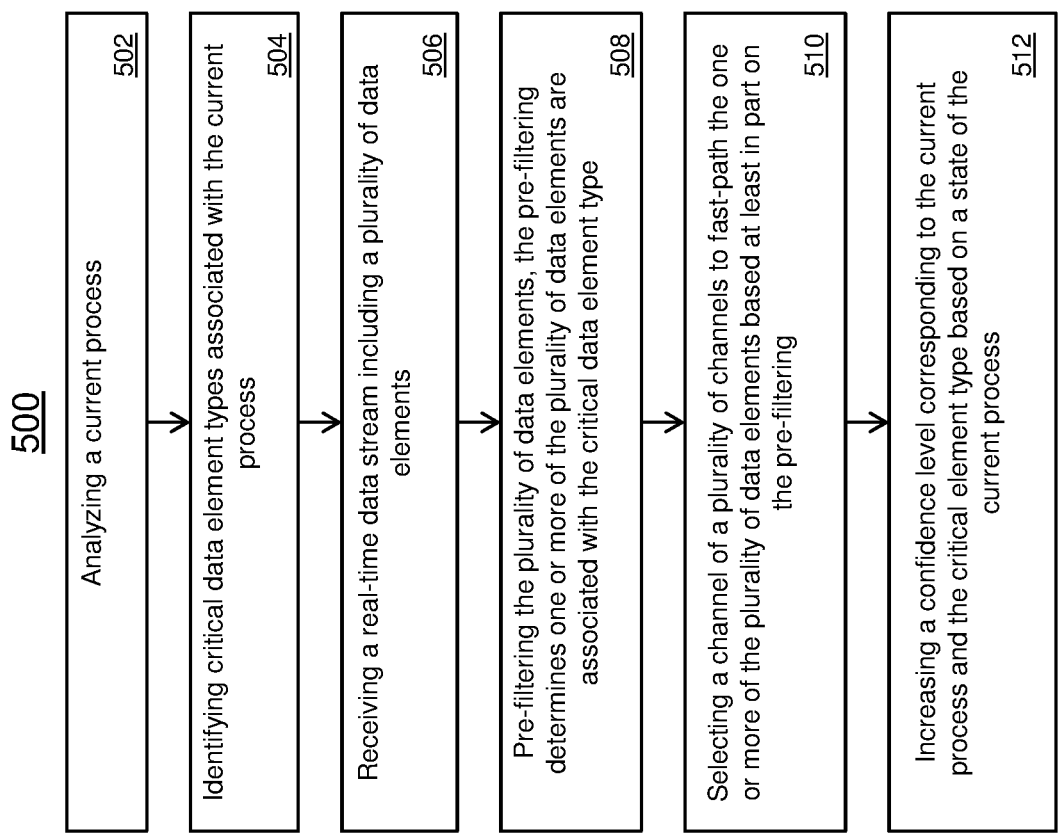
FIG. 5 depicts a method for channeling data elements in an analytics engine environment in accordance with one or more embodiments.

Referring now to FIG. 5, a method 500 for channeling data elements in an analytics engine environment is provided. Block 502 provides analyzing a current process. In one or more embodiments, an analytics engine is troubleshooting an issue associated with a particular process. In one or more embodiments, the current process includes analyzing data received from storage and the real-time data received from the receiver.

Block 504 provides identifying critical data element types associated with the current process. In one or more embodiments, a plurality of critical data element types can be determined. As a non-limiting example, a critical data element type can be based on a particular source of data, format, temporal information, etc. For example, the critical data elements can indicate a source and data elements that were received in the last five minutes. If both criteria are not met, then the particular data element does not qualify as critical element data to be fast pathed over one or more channels in the system.

Block 506 provides receiving a real-time data stream including a plurality of data elements. In one or more embodiments, a received is configured to receive real-time data from a plurality of sources. The real-time data includes a plurality of data elements of different types. In an embodiment, information indicating the type of data elements is provided in the metadata associated with each data element. The receiver can be configured to read the metadata and pre-filter each data element of the real-time data stream based on the metadata.

Block 508 provides pre-filtering the plurality of data elements, wherein the pre-filtering determines one or more of the plurality of data elements are associated with the critical data element type. In one or more embodiments, the pre-filtering is performed by a receiver of the real-time data stream. In one or more embodiments, the receiver executes the pre-filtering operation based on the associated metadata for each data element.

Block 510 provides selecting a channel of a plurality of channels to fast-path the one or more of the plurality of data elements based at least in part on the pre-filtering. In one or more embodiments, the receiver selects the channel based on the bandwidth of each of the channels and/or also the individual states of each of the channels. In an embodiment, the receiver can be configured with the bandwidth information for each channel. In a scenario, where a channel having the highest bandwidth is congested, a different channel can be selected to transmit the data elements to the analytics engine. The objective of the receiver is to select the channel to transmit the critical data elements the fastest to the analytics engine in an efficient manner, providing at times the channel configured with the highest bandwidth is not selected.

In one or more embodiments, the data channels are defined with a data travel/priority speed. In one embodiment, in the system Z a channel can be a HiperSocket which can forward the tagged data over the selected channel. In one or more embodiments, the receiver can receive back from the analytics engine to determine the type of data elements that are critical to resolving the issue currently being processed by the analytics engine. In an example, in a particular instance a temporal threshold for data can be set to four hours, however a shift in the analysis of the current process may require a 30 minute temporal threshold. This indication be updated and fed back to the receiver for pre-filtering. Other criteria can be provided to the receiver to pre-filter the data elements for fast-pathing. In one or more embodiments, the data type and other metadata can be matched to determine which the data elements to be fast pathed. For example, if the data is relative but too old, the information will not be fast pathed. The age of the incoming data is important in the analysis of the current process.

In one or more embodiments, the fast pathing includes tagging, by the receiver, the pre-filtered data elements to indicate the critical data element type for fast pathing over the one of a plurality of channels and using the tags to transmit the data over a selected fast path channel. In one or more embodiments, the urgent data is tagged for fast pathing over a channel.

Block 512 provides increasing a confidence level corresponding to the current process and critical data element type based on the state of the current process. In one or more embodiments, the system can store confidence level information indicating the critical data element type(s) that aided in resolving the current process being studied by the analytics engine.

In one or more embodiments, the analytics engine can detect patterns among the various processes and identify critical elements and use that information for fast pathing data elements. The channeling of the data elements can be based on the self-learned information.

In one or more embodiments, the described techniques are an improvement of the prior art by providing a mechanism to fast path critical elements of a real-time data stream based at least in part on a current problem being targeted by an analytics engine. Because the issues that are targeted by the analytics engine can change over time, the type of critical elements used to analyze each issue can also vary over time. For example, critical elements in one instance may be valuable while in another instance all criticality is lost based on when the information is received. This information and the status and configuration of the plurality of channels are used to select a channel to deliver the critical data elements to the analytics engine efficiently. This system does not simply select the channel having the highest transfer rate but also considers the availability of each channel. A channel that is configured with the highest transfer rate may not be selected if the channel is congested with a plurality of data elements.

The techniques described herein can increase the efficiency of a computing system by resolving system issues by fast pathing the urgent data that are critical to the analysis. Additionally, if the issues are resolved in a timely manner the bandwidth usage of the channels in the system can be managed to increase performance of the system by balancing the data elements over the available channels in the system. Also, information can be provided to the systems and/or external systems that are being analyzed by the analytics engine. The system is able to self-learn the optimal combinations of critical data element types and associated targeted processes by using confidence levels for each combination. The system increases the issue resolution efficiency in the system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system for channeling elements in an analytics engine environment, the system comprising:
   a receiver including a decision engine;
   a plurality of channels;
   an analytics engine, wherein the plurality of channels connects the receiver to the analytics engine, wherein each channel of the plurality of channels is associated with a bandwidth, wherein the bandwidth is a transfer rate of the channel;
   a storage medium, the storage medium being coupled to a processor;
   the processor configured to:
   analyze a current process;
   identify critical data element types associated with the current process;
   receive a real-time data stream including a plurality of data elements;
   pre-filter the plurality of data elements, wherein the pre-filtering determines one or more of the plurality of data elements are associated with a critical data element type from the identified critical data element types;
   select a channel of a plurality of channels to fast-path the one or more of the plurality of data elements based at least in part on the pre-filtering, wherein the selected channel is based at least in part on the bandwidth and current availability each of the plurality of channels;

increase a confidence level corresponding to the current process and the critical data element type, wherein the confidence level is increased based on a state of the current process; and provide feedback from the analytics engine directly to the receiver to dynamically update the critical element type during the current process to be pre-filtered based on the analyzing of the current process and increased confidence level, wherein the pre-filtering is based on metadata associated with each of the one or more of the plurality of data elements, wherein the receiver uses the updated critical data element type to pre-filter a different set of data elements.

2. The system of claim 1, wherein the processor is further configured to store a record correlating the current process and critical data element type, and increasing the confidence level based on a performance of the current process.

3. The system of claim 1, wherein responsive to determining one or more of the plurality of data elements is associated with the critical data element type, tagging the pre-filtered one or more of the plurality of data elements to indicate the critical data element type for fast pathing over the selected channel of the plurality of channels; and transmitting the pre-filtered one or more of the plurality of data elements to the analytics engine over the selected channel based on the tag.

4. The system of claim 1, wherein the processor is further configured to define a confidence level threshold corresponding to the current process and the critical element data type.

5. The system of claim 1, wherein the processor is further configured to define a temporal threshold for the critical element data type based on the current process.

6. A computer program product for channeling elements in an analytics engine environment, the computer program product comprising:

a non-transitory computer readable storage medium having stored thereon first program instructions executable by a processor to cause the processor to:

analyze a current process;

identify critical data element types associated with the current process;

receive a real-time data stream including a plurality of data elements;

pre-filter the plurality of data elements, wherein the pre-filtering determines one or more of the plurality of data elements are associated with a critical data element type from the identified critical data element types;

select a channel of a plurality of channels to fast-path the one or more of the plurality of data elements based at least in part on the pre-filtering, wherein the selected channel is based at least in part on a bandwidth and current availability each of the plurality of channels, wherein the plurality of channels connects a receiver to an analytics engine, wherein each channel of the plurality of channels is associated with a bandwidth, wherein the bandwidth is a transfer rate of the channel;

increase a confidence level corresponding to the current process and the critical data element type, wherein the confidence level is increased based on a state of the current process; and provide feedback from the analytics engine directly to the receiver to dynamically update the critical element type during the current process to be pre-filtered based on the analyzing of the current process and increased confidence level, wherein the pre-filtering is based on metadata associated with each of the one or more of the plurality of data elements, wherein the receiver uses the updated critical data element type to pre-filter a different set of data elements.

7. The computer program product of claim 6, wherein the instructions are further executable by the processor to cause the processor to store a record correlating the current process and critical data element type, and increasing the confidence level based on a performance of the current process.

8. The computer program product of claim 6, wherein responsive to determining one or more of the plurality of data elements is associated with the critical data element type, tagging the pre-filtered one or more of the plurality of data elements to indicate the critical data element type for fast pathing over the selected channel of the plurality of channels, and transmitting the pre-filtered one or more plurality of data elements to the analytics engine over the selected channel based on the tag.

9. The computer program product of claim 6, wherein the instructions are further executable by the processor to cause the processor to define at least one of a confidence level threshold corresponding to the current process and the critical element data type or a temporal threshold for the critical element data type based on the current process based on the current process.

* * * * *